United States Patent Office 3,206,434
Patented Sept. 14, 1965

3,206,434
POLYMER TREATMENT
Northrop Brown and Glenn Fredrick Leverett, Wilmington, Del., assignors to E. I. du Pont de Nemours and Company, Wilmington, Del., a corporation of Delaware
No Drawing. Filed Sept. 4, 1962, Ser. No. 221,336
4 Claims. (Cl. 260—67)

This invention relates to a novel process for removing catalyst residues from a polyoxymethylene, and, more particularly, it relates to the treatment of a polyoxymethylene containing volatile Lewis acids with selected compounds which may be employed to remove the Lewis acid without adversely affecting the physical properties of the plastic.

In many processes, such as the process described in copending application, Serial No. 216,754, filed on August 14, 1962, by G. F. Leverett et al., it is advantageous to treat polyoxymethylene with acidic compounds, e.g., with volatile Lewis acids, such as boron trifluoride. These acids if permitted to remain upon the polymer will adversely affect the thermal stability thereof and will make the polymer difficult to process according to known techniques for increasing the stability of a polyoxymethylene polymer.

It has now been discovered that polyoxymethylenes having minor amounts of volatile acids therein may be contacted with a compound of the type described hereinbelow, wherein the compounds serve to remove the volatile acid which removal results in a polymer having improved processability and higher thermal stability. Accordingly, it is an object of this invention to provide a process for removing volatile Lewis acids from polyoxymethylenes. Other objects will appear hereinafter.

The above objects are accomplished by providing a process for removing a volatile Lewis acid from polyoxymethylene which comprises contacting the polyoxymethylene with an inert compound having an element selected from the class consisting of oxygen and sulfur and being a member selected from the class consisting of alkyl, alkenyl, cycloalkyl, and aryl esters having 2 to 14 carbon atoms, and preferably alkyl esters having from 2 to 10 carbon atoms, aryl esters having from 8 to 11 carbon atoms, alkenyl esters having from 2 to 10 carbon atoms, and cycloalkyl esters having 6 to 14 carbon atoms, and mixed homologues thereof, alkyl, alkenyl, cycloalkyl, and aryl ethers having 2 to 14 carbon atoms, and preferably alkyl ethers having 2 to 10 carbon atoms, aryl ethers having 7 to 10 carbon atoms, alkenyl ethers having 2 to 10 carbon atoms, and cycloalkyl ethers having 6 to 14 carbon atoms, and mixed homologues thereof, acetals and ketals having 2 to 10 carbon atoms and alcohols having 1 to 5 carbon atoms. More particularly, the above objects are accomplished by contacting one part by weight of a polyoxymethylene having a minor amount of a Lewis acid therein with 0.1 to 1000 parts by weight of an inert oxygen or sulfur containing organic compound, e.g., methyl formate, at a temperature not greater than about 180° C. for substantially crystalline polyoxymethylenes, and not greater than about 170° C. for polyoxymethylene having a crystallinity less than about 95%, and thereafter recovering a material of improved stability.

The process of the present invention may be employed with a wide variety of polyoxymethylenes, namely, those polymers having a predominance of recurring oxymethylene units (—CH$_2$O—)$_n$. Such polymers may be prepared by way of several processes for the polymerization of formaldehyde, trioxane, or polymers of the higher aldehydes. These polymers and processes for their preparation are described in part in United Stated patents 2,734,889, issued February 14, 1956, to F. C. Starr, Jr.
2,768,994, issued October 30, 1956, to R. N. MacDonald
2,795,571, issued June 11, 1957, to A. R. Schneider
2,828,286, issued March 25, 1958, to R. N. MacDonald
2,841,570, issued July 1, 1958, to R. N. MacDonald
2,844,561, issued July 22, 1958, to M. F. Bechtold et al.
2,848,437, issued August 19, 1958, to W. P. Langsdorf et al.
2,994,687, issued August 1, 1961, to H. H. Goodman et al.
3,000,860, issued September 19, 1961, to N. Brown et al.
3,000,861 issued September 19 1961 to N. Brown et al.

One variety of polyoxymethylene, i.e. polyoxymethylene dicarboxylates, may be prepared by the processes described and claimed in United States patents 2,964,500, issued December 13, 1960, to S. H. Jenkins et al.
2,998,409, issued August 29, 1961, to S. Dal Nogare et al.

Polyoxymethylene diethers may be prepared by the processes described and claimed in copending patent applications Ser. No. 682,325, filed September 6, 1957, by N. Brown et al.
Ser. No. 785,136, filed January 6, 1959, by N. Brown et al.

Included within the term polyoxymethylene for purposes of this application are copolymers containing a predominance of oxymethylene groups, such as those prepared by the techniques set forth in United States patents 2,828,287, issued March 25, 1958, to T. L. Cairns et al.
3,027,352, issued March 27, 1962, to K. W. Bartz et al.

and in copending applications

Ser No. 35,419, filed June 13, 1960, by N. Brown et al., now U.S. Patent 3,076,786, issued February 5, 1963
Ser. No. 35,420, filed June 13, 1960, by N. Brown et al.
Ser. No. 35,421, filed June 13, 1960, by E. T. Cline et al., now abandoned
Ser. No. 51,294, filed August 23, 1960, by. E. T. Cline et al.
Ser. No. 91,318, filed February 24, 1961, by E. T. Cline.

The inert organic compounds which are operable in the process of the present invention to remove normally volatile Lewis acids, i.e. those acids having an atmospheric boiling point not greater than about 250° C. should not form a non-volatile salt with the acidic material to prevent removal of the complex. The preferred compounds of the present invention are the oxygen-containing organic materials including primary and secondary alcohols having 1 to 5 carbon atoms, aryl esters having 8 to 11 carbon atoms such as methyl benzoate and butyl benzoate, alkyl esters having 2 to 10 carbon atoms such as methyl formate and amyl propionate, and alkenyl esters having from 2 to 10 carbon atoms such as vinyl acetate and divinyl adipate. Ethers, including aryl ethers, having from 7 to 10 carbon atoms, such as methyl phenyl ether, and butyl phenyl ether, alkyl ethers having 2 to 10 carbon atoms such as dimethyl ether and alkenyl ethers having 3 to 10 carbon atoms such as methyl vinyl ether and octyl vinyl ether are also among the classes of preferred inert oxygen-containing organic compounds as are the acetals, e.g. acetal and methylal, and cyclic ethers such as dioxane.

The compound which removes catalyst residues must not form a non-volatile complex with the particular acid nor should it readily nor excessively attack the polymer to degrade same. The preferred compounds for the practice of the process of the present invention are the alkyl esters, such as methyl formate and methyl acetate having 2 to 10 carbon atoms per molecule, and preferably 2 to 3 carbon atoms per molecule.

The volatile Lewis acids which may be removed by the process of the present invention include Lewis acids usually of the Friedel-Crafts type such as aluminum trichloride, tin tetrachloride, tin tetrabromide, titanium tetrachloride, titanium tetrabromide, boron trifluoride, boron trichloride, boron tribromide, antimony trichloride, antimony pentachloride, antimony fluoride, and volatile salts of strong acids (pK less than 2.0) with weak bases, e.g. oxonium salts of sulfuric acid and dioxane. The metal halides in certain complexes may also be removed by the process of the present invention. Such complexes include tertiary amine complexes and ether complexes. Examples of amines which will complex with the metal halides include trimethyl amine, tripropyl amine, dimethyl stearylamine, dimethyl cyclohexylamine, dimethyl butylamine, diethyl cyclohexylamine, diethyl butylamine, and pyridine. Examples of ethers which will complex with the aforementioned metal halides are the dialkyl ethers, such as dimethyl ether, diethyl ether, dibutyl ether, and dipropyl ether. It may be observed from the following examples that reaction conditions for accomplishing the removal of volatile acids from the polymers of the present invention offer a wide variety of conditions which may be used in the different embodiments of this invention. Inert gases, such as nitrogen and carbon dioxide, which are relatively pure, may be added as diluents along with the compound which removes the volatile acid. Other diluents will be apparent to skilled chemists. The time of treatment may be as long as practically necessary to reach substantial removal of the acidic material and with long treatment times, temperatures as low as 20° C. may be employed, while temperatures approaching the melting point of the polymer may be employed with short reaction times. Vapor media may be employed at a temperature exceeding the melting point of the polymer for momentary contact, however, care must be taken to avoid melting the polymer and to prevent attack of the acid upon the polymer by prolonged retention of the acid upon the polymer at elevated temperatures.

The removal of the volatile Lewis acid is amply illustrated by the fact that the polymer may be subsequently processed according to the technique set forth in the example to recover a useful polymer from the starting material. The thermal stability of the polymer also may be used as an indication of the amount of acid remaining upon the material.

Generally, a polymer having a weight loss of less than 20% in one hour at 259° C. will possess satisfactory thermal stability for further processing. The thermal stability of the polymer treated according to the process of the present invention may be measured by determining the weight loss at elevated temperatures over a specific time interval. The thermal stability of a polymer is determined by weighing approximately 2/10 of a gram of polymer into a small beaker made of "Teflon" tetrafluoroethylene resin which had been cleaned with nitric acid, placing the beaker in a glass tube to which vacuum is applied and placing the tube in a vapor bath at 259° C. Vapors of diphenyl ether are suitable in this operation. The weight of the sample before and after heating for one hour is noted to determine the weight loss over that time interval.

Another test, which may be employed to determine the retention of physical properties and molecular weight of the polymers treated by the process of this present invention, is the measurement of inherent viscosity (I.V.). This quantity is measured by dissolving 0.125 gram of the polymer and 25 milliliters of reagent grade phenol which has been purified by distillation from solid caustic. The polymer is not readily soluble in phenol at room temperature and usually the mixture is heated to 120° C. to increase the rate of solution of the polymer. The viscosity of the phenol solvent and the viscosity of the phenol polymer solution is measured at 90° C. by noting the time required to pass the same volume of each material through an Ostwald viscometer. The I.V. is then determined by using the formula $$I.V. = \frac{2.303 \log \frac{\text{time of solution}}{\text{time of solvent}}}{\text{grams of polymer}/100 \text{ ml. solution}}$$

The following examples are presented to illustrate and not to restrict the present invention. Parts and percentages are based on weight unless otherwise specified.

EXAMPLE I

This example illustrates the application of the process of the present invention to stabilize a polymer for subsequent treatment to replace relatively unstable end groups on the polymer chain with more stable groups.

Approximately 67.2 grams of polyoxymethylene prepared according to the process set forth in United States Patent 3,000,860 having an I.V. of 0.47 was placed in a fixed reactor which comprised a cylindrical glass vessel having a porous fritted bottom, a vapor exit below the frit, and a vapor inlet above the frit. The frit acted to retain the polymer in the vessel. The temperature of the reactor was raised to 160° C. by immersing the reactor in a controlled temperature oil bath, and when the polymer reached 160° C., a vapor stream containing 0.3 of a mole percent in nitrogen of the complex of boron trifluoride and dimethyl ether was passed downflow through the polymer for 10 minutes. This stream amounted to $74 \times 10^{-6}$ moles per minute of $BF_3O(CH_3)_2$ and $23 \times 10^{-3}$ moles per minute of nitrogen. At the end of the aforementioned period, the flow of the boron trifluoride complex was stopped and the nitrogen flow continued for an additional 20 minutes, following which the reactor was cooled to room temperature by removing it from the bath. Approximately 62.2 grams of polymer were recovered from the reactor.

Twelve grams of polymer treated as described hereinabove and 200 cc. of commercial grade propionic anhydride were charged to a clean, stirred flask. The temperature was increased over a period of about 13 minutes until the polymer dissolved at 173° C., whereupon the solution was cooled at a rate of about 2° C. per minute by removal of the heat source. Precipitation of the polymer occurred at about 137° C., whereupon the precipitate was recovered by filtration and reslurried with acetone while on the filter following which it was dried to constant weight at 140° C. Approximately 11.4 grams of polymer were recovered which exhibited an inherent viscosity of essentially 0. Repetition of the above experiment in most cases failed to produce a useable polymer as indicated by the unacceptable inherent viscosity.

In order to demonstrate the effectiveness of the treatment process of the present invention, 12 grams of the polymer which had been treated with boron trifluoride as described above were charged to a fixed reactor of the type aforementioned and heated to 160° C. by immersing the reactor in an oil bath. When the polymer reached 160° C., $12 \times 10^{-3}$ moles per minute of nitrogen saturated with methyl formate at 27° C. were passed downflow through the polymer for 20 minutes following which nitrogen was passed downflow through the reactor for an additional 10 minutes. After completion of the nitrogen purge at this elevated temperature, the reactor was cooled to room temperature while continuing the nitrogen flow for about 10 to 15 minutes and 11.8 grams of polymer were recovered. In order to demonstrate the stability of the material treated as described, 11.5 grams of this polymer were charged to a stirred reactor and treated with 200 grams of propionic anhydride according to the technique as set forth above. Approximately 10.9 grams of polymer were recovered which polymer exhibited an I.V. 0.855. It will be readily apparent from the foregoing example that polymers containing volatile Lewis acids may be treated according to the process of the present invention rendering them amenable to further stabilization with virtually no adverse effect upon the physical properties of the polymer.

EXAMPLE II

This example illustrates the improvement in thermal stability of a polymer which is realized by the application of the process of the present invention. Table I shows a comparison between the thermal stability of polymers which have been alkylated using a Lewis acid catalyst according to the procedure set forth hereinbelow and which have been subsequently treated with the sparging agents shown in Table I at the temperature and times indicated. Polymer for testing was prepared by dissolving 50 grams of polymer prepared according to the process set forth in United States Patent 3,000,860 in a mixture of 270 grams of dry p-dioxane, 30 grams of trimethyl orthoformate and 0.05 gram of boron trifluoride dimethyl etherate at 160° C. After all of the solid polymer had dissolved, the solution was slowly cooled to precipitate the polymer which was recovered by filtration and washed several times with acetone following which it was air-dried. This recovered material was divided into several portions and treated as shown in Table I. It will be readily apparent from the data presented in Table I that a marked improvement in thermal stability is realized by treating the polymer according to the present process.

The process of the present invention finds widespread use in the treatment of oxymethylene-containing polymers where it is desired to apply a subsequent chemical treatment to the polymer or where it is desired to simply remove volatile Lewis acid to permit further physical processing of the polymer, i.e. extruding for injection molding of the polymer into various shaped articles such as films, fibers, and funicular objects.

Table I

| Sparging Agent | Tebperature of Polymer During Sparging, °C. | Time of Sparging (hours) | Thermal Stability of Sparged Polymers (percent weight loss/hour) |
| --- | --- | --- | --- |
| Nitrogen | 120 | 2 | 42.6 |
| Dioxane vapor | 120 | 1 | 17.1 |
| Methyl formate nitrogen (50/50 mole percent) | 160 | 2 | 7.7 |
| Methanol vapor | 160 | 2 | 10.9 |

We claim:

1. A process for removing a normally volatile Lewis acid from a preformed polyoxymethylene which comprises contacting said preformed polyoxymethylene with the vapor of an inert organic compound having an element selected from the class consisting of oxygen and sulfur and being a member of the class consisting of alkyl, alkenyl, cycloalkyl and aryl esters having from 2 to 14 carbon atoms and mixed homologues thereof; alkyl, alkenyl, cycloalkyl, and aryl ethers having 2 to 14 carbon atoms and mixed homologues thereof; acetals having 2 to 10 carbon atoms and alcohols having 1 to 5 carbon atoms; and thereafter recovering a polyoxymethylene which is substantially free from said Lewis acid.

2. The process of claim 1 wherein said Lewis acid is boron trifluoride.

3. The process of claim 2 wherein said inert organic compound is methyl formate.

4. A process for removing a normally volatile Lewis acid from a preformed polyoxymethylene which comprises contacting one part by weight of a preformed polyoxymethylene with 0.1 to 1000 parts by weight of an inert organic compound having an element selected from the class consisting of oxygen and sulfur, and being a member of the class consisting of alkyl, alkenyl, cycloalkyl and aryl esters having 2 to 14 carbon atoms and mixed homologues thereof; alkyl, alkenyl, cycloalkyl, and aryl ethers having 2 to 14 carbon atoms and mixed homologues thereof; acetals having 2 to 10 carbon atoms and alcohols having 1 to 5 carbon atoms; at a temperature less than about 180° C., and thereafter recovering said polyoxymethylene which is substantially free from said Lewis acid.

References Cited by the Examiner
UNITED STATES PATENTS

| | | | |
| --- | --- | --- | --- |
| 2,989,508 | 6/61 | Hudgin et al. | 260—67 |
| 2,989,509 | 6/61 | Hudgin et al. | 260—67 |
| 3,119,789 | 1/64 | Evers | 260—67 |

WILLIAM H. SHORT, *Primary Examiner.*